United States Patent Office 3,109,736
Patented Nov. 5, 1963

3,109,736
LIGHT-SENSITIVE MEROCYANINE DYE BASE COMPOSITIONS
Robert H. Sprague, Chagrin Falls, and Joseph J. Urbancik, Cleveland, Ohio, assignors to Horizons Incorporated, a corporation of New Jersey
No Drawing. Filed Apr. 6, 1962, Ser. No. 185,508
7 Claims. (Cl. 96—90)

This invention relates to novel merocyanine dye bases having particular utility as constituents in a visible-light sensitive print-out photoprocess.

One object of this invention is to provide new and useful merocyanine dye bases.

Another object of the invention is to provide compositions based on said merocyanine dye bases which when exposed to light alone, or to light and then heat, yield colored print-out images at speeds sufficient for photographic purposes.

A more specific object is to provide a new family of complex merocyanines represented by the following general formula:

$$R-N-(CH=CH)_{a-1}-C=(CH-CH)_{b-1}C\overset{Z}{\underset{Q}{<}}C=(CH-CH)_{c-1}=\overset{R_3}{C}-C=(CH-CH)_{d-1}-N\overset{Y}{<}$$
$$\overset{|}{O=C-N}\overset{|}{R_2}$$

where

R is selected from the group consisting of lower alkyl and benzyl
$R_2$ is selected from the group consisting of lower alkyl, aryl and benzyl
$R_3$ is selected from the group consisting of hydrogen and —CN
a is an integer of from 1 to 2
b is an integer of from 1 to 3
c is an integer of from 1 to 3
d is an integer of from 1 to 2
Y and Z each represents the nonmetallic atoms selected from the group consisting of C, S, Se, O, and N, necessary to complete a heterocyclic organic nucleus containing from 5 to 6 atoms in the ring
Q represents a member selected from the group consisting of an oxygen atom, a sulfur atom, a selenium atom, and a group consisting of $$-\overset{|}{N}-R_4$$

wherein $R_4$ represents a member selected from the group consisting of a lower alkyl group, an aryl group and benzyl A particular object of the invention is to provide a new family of complex merocyanine dye bases represented by the following general formula:

wherein R, $R_2$, $R_3$, b, c, Z and Q each have the same meaning as in the preceding general formula and L represents a monovalent radical selected from the group consisting of and A preferred mode of preparing the merocyanines of the type indicated is to condense quaternized merocyanines bearing an active alkyl mercapto or anilido grouping with a cyanomethyl compound such as 2- or 4-cyanomethylquinoline or 2-cyanomethylbenzothiazole, e.g, in the manner indicated in the examples below. These and other objects of the invention will be made apparent from the following examples describing the preparation of some of the merocyanine dye bases representative of preferred species of the invention and not intended to exhaustively cover all of the useful members of this class.

EXAMPLE 1

3-Ethyl-5-(3-Ethyl-2(3H)-Benzothiazolylidene)-2-[(Cyano)-2-Quinolylmethylene]-4-Thiazolidone (III)

The above compound was prepared as follows:

2-methylmercaptobenzothiazole ethyl ethosulfate, 48.0 g. (0.145 mole), and 3-ethylrhodanine, 23.4 g. (0.145 mole), were combined in 125 ml. of absolute ethanol containing 18.1 g. (0.18 mole) of triethylamine. The mixture was boiled under reflux for five minutes, then chilled. After washing with methanol, the product was dried to constant weight. The yield of yellow crystals of 3 - ethyl - 5 - (3-ethyl-2(3H)-benzothiazolylidene)-rhodanine (I) was 29.5 g. (63.15%), with melting point of 245–247° C.

(I), 27.9 grams (0.0865 mole), and methyl-p-toluenesulfonate, 48.42 g. (0.26 mole), were heated together in a flask at 110° C. for four hours. The reaction mixture was then cooled, diluted with 250 ml. acetone and chilled. After filtration and washing, with fresh acetone, the product was air-dried to constant weight. The yield of 5-(3-ethyl - 2(3H) - benzothiazolylidene) - 2 - methylmercapto - 4(5) - thiazolidone ethyl-p-toluenesulfonate (II) was 41.0 g. (95.35%) of dull yellow crystals, with a melting point of 185–192° C.

5-(3-ethyl-2(3H)-benzothiazolylidene) - 2 - methylmercapto-4(5)-thiazolone ethyl-o-toluenesulfonate, 3.0 grams (0.0059 mole), and 2-quinolylacetonitrile, 0.99 g. (0.0059 mole), were placed in 50 ml. absolute ethanol containing 1 ml. of piperidine. The mixture was boiled for twenty-five minutes, then chilled.

After filtration and washing with acetone, the yield of crude crystalline solids was 2.41 g. On recrystallization from 1800 ml. of hot acetone, the yield of yellow crystals was 2.1 g. (86.7%), with a melting point of 311–314° C.

The absorption maximum at density of 1.0 was 465 m$\mu$ at a concentration of 1/210,000 in acetone.

EXAMPLE 2

3-Ethyl-5-(3-Ethyl-2(3)-Benzothiazolylidene)-2-(2-Quinolylmethylene)-4-Thiazolidone (IV)

One gram (0.0022 mole) of 3-ethyl-5-(3-ethyl-2(3H)-benzothiazolylidene) - 2 - [cyano-2-quinolylmethylene]-4-thiazolidone, prepared as in Example 1, was boiled three minutes in 50 ml. of 60% H₂SO₄. The mixture was cooled rapidly and poured on crushed ice. After neutralization with NH₄OH and filtration, the yield of crude product was 0.8 gram.

Recrystallization from acetone resulted in 0.40 g. of yellow crystals, having a melting point of 222–224° C.

The absorption maximum determined in acetone was 0.665 at 463 mμ at concentration of 1/200,000.

EXAMPLE 3

3-Ethyl-5-(3-Ethyl-2(3H)-Benzothiazolylidene)-2-[(Cyano)-4-Quinolylmethylene]-4-Thiazolidone

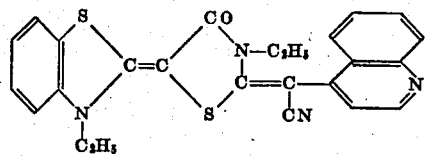

Three grams (0.0059 mole) of 5-(3-ethyl-2(3H)-benzothiazolylidene)-2-methylmercapto - 4(5) - thiazolidone ethyl-p-toluenesulfonate, prepared as in Example 1, and 4-quinolylacetonitrile, 0.99 g. (0.0059 mole), were placed in 100 ml. of absolute methanol containing 1 ml. of piperidine. The mixture was boiled under reflux for thirty minutes, then chilled overnight.

The yield of crude crystalline product, after washing and filtration with acetone, was 1.60 g. After recrystallization from 1500 ml. of hot acetone, the yield of yellow crystals was 1.1 g. (40.1%), with a melting point of 280–282° C.

The absorption maximum was 0.635 at 410 mμ at a concentration of 1/160,000 in acetone.

EXAMPLE 4

3-Ethyl-5-(3-Ethyl-2(3H)-Benzothiazolylidene)-2-(4-Quinolylmethylene)-4-Thiazolidone

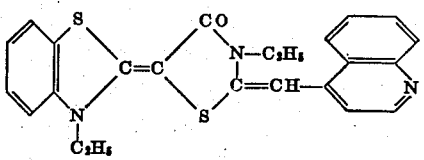

3-ethyl-5-(3 - ethyl - 2(3H) - benzothiazolylidene) - 2 - [(cyano)-4-quinolylmethylene]-4-thiazolidone, 0.5 gram (0.0011 mole), was boiled two minutes in 40 ml. of 60% H₂SO₄. The yellow solution was cooled rapidly and poured on crushed ice. Neutralization with NH₄OH and filtration gave a crude yield of 0.4 g.

Recrystallization from 100 ml. acetone resulted in 0.25 g. (52.0%) of brownish-red crystals. Melting point was 190–192° C., with decomposition.

This product gave an absorption maximum of 0.84 at 434 mμ in acetone at a concentration of 1/110,000.

EXAMPLE 5

3-Ethyl-5-(3-Ethyl - 2(3H) - Benzothiazolylidene)-2-[(3-Cyano)-3-(2-Quinolyl)-Allylidene]-4-Thiazolidone (VIII)

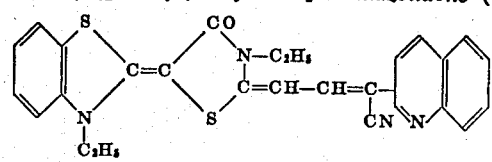

The above was prepared by the following method involving the preparation of the indicated intermediates:

(a) 2-dicarbethoxymethylene - 3 - ethyl - 5 - (3-ethyl-2(3H) - benzothiazolylidene) - 4 - thiazolidone (V).— Forty-five grams (0.0886 mole) of 5-(3-ethyl-2(3H)-benzothiazolylidene) - 2 - methylmercapto - 4(5) - thiazolidone ethyl-p-toluenesulfonate, prepared as in Example 1, and diethylmalonate 15.6 g. (0.0886 mole plus 10% excess) were added to 150 ml. absolute ethanol containing 12.12 g. (0.12 mole) of triethylamine. The mixture was refluxed for forty minutes, then chilled.

The yellow crystals were filtered off, washed with methanol, and air-dried, resulting in a crude yield of 20.0 g. After recrystallization from 150 ml. acetone, the yield was 14.7 g. (37.02%) of (V), with a melting point of 163–167° C.

(b) 5 - (3-ethyl-2(3H)-benzothiazolylidene) - 2 - methyl-4(5) - thiazolone ethiodide (VI).—(V), 14.7% grams (0.0328 mole), was combined with 167 ml. of 15% hydrochloric acid, and boiled under reflux for thirty-five minutes, cooled, and filtered.

The filter cake was slurried with fresh acid, refluxed thirty-five minutes, cooled and chilled. The solution was filtered and the residue discarded.

The filtrates were combined and concentrated to 15 ml. with the aid of vacuum and low heat.

To the concentrate were added 40 ml. ethanol and 50 ml. of saturated NaI solution in methanol. The resulting yellow solution was chilled two hours at 0° C., then filtered and washed with methanol and water. The yield of bright yellow crystals was 12.2 g. (86.09%), based on dicarbethoxy compound, having a melting point of 210–215° C.

(c) 2-(β-acetanilidovinyl)-5-(3-ethyl-2(3H) - benzothiazolylidene) - 4(5) - thiazolone ethiodide (VII).—Five grams (0.0115 mole) of (VI) and 2.26 g. (0.0115 mole) of diphenylformamidine were combined in 35 ml. of acetic anhydride. The mixture was refluxed for ten minutes, then chilled four hours.

The yield of dark purple crystals after filtration was 5.0 g. (75.3%), with a melting point of 275–279° C.

From this, the desired merocyanine dye base was prepared as follows:

2-(β - acetanilidovinyl) - 5 - (3-ethyl-2(3H)-benzothiazolylidene) - 4(5) - thiazolone ethiodide (VII), 2.2 g. (0.0038 mole), and 2-quinolylacetonitrile, 0.64 g. (0.0038 mole), were added to 50 ml. absolute ethanol containing 1 ml. piperidine. The mixture was boiled under reflux for ten minutes, then chilled overnight.

After filtration and washing with methanol, the crude yield was 1.70 g.

Recrystallization from absolute methanol resulted in 1.25 g. (67.9%) yield of red crystals having a melting point of 306–309° C.

The absorption maximum of this product was 0.92 at 505 mμ in acetone per concentration of 1/60,000.

Analysis.—Calcd. for C₂₇H₂₂N₄OS₂: C, 67.19; H, 4.56; N, 11.62; S, 13.30. Found: C, 67.23; H, 4.92; N, 10.90; S, 13.39.

EXAMPLE 6

3-Ethyl-5-(3-Ethyl-2(3)-Benzothiazolylidene)-2-[3-(2-Quinolyl)-Allylidene]-4-Thiazolidone (IX)

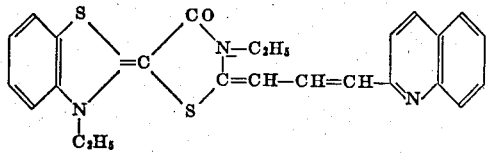

Two-hundred milliliters of 60% H₂SO₄ and 0.9 g. (0.0018 mole) of (VIII) were combined and heated slowly to boiling. The solution was boiled one minute, cooled rapidly, and poured on ice. Filtration after neutralization with conc. NH₄OH resulted in a crude yield of dark red solid of 0.8 g.

The crude product was chromatographed through a 16-inch alumina column, using CHCl₃. The chloroform solution was concentrated to a small volume, and petroleum ether was added. The product precipitated as a dark-red amorphous solid in 24.4% (0.20 g.) yield, with a melting point of 140–143° C. (dec.).

The absorption maxima at densities 0.85 and 0.395 were 450 mμ and 370 mμ, respectively, at concentration of 1/110,000 in acetone.

EXAMPLE 7

*3-Ethyl-5-(3-Ethyl-2(3)-Benzothiazolylidene)-2-[(1-Cyano)-3-(4-Quinolyl)-Allylidene]-4-Thiazolidone*

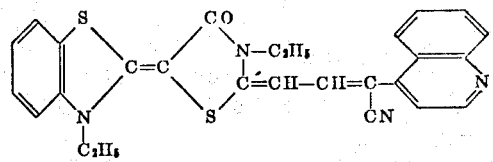

Five grams of (VII) (0.0087 mole) and 1.46 g. (0.0087 mole) of 4-quinolylacetonitrile were combined in 60 ml. of absolute ethanol containing 1.5 ml. of piperidine. The solution was refluxed fifteen minutes, then chilled overnight. The yield of red crystalline solids, after filtration and washing with ethanol, was 4.0 g. with a melting point of 124–128° C.

Recrystallization from absolute ethanol yielded 0.8 g. (19.1%) of a dark-red amorphous solid with a melting point of 134–136.5° C.

The absorption maximum at density of 0.65 was 475 mμ at a concentration of 1/130,000 in acetone.

EXAMPLE 8

*3-Ethyl-5-(3-Ethyl-2(3)-Benzothiazolylidene)-2-[3-4-Quinolyl)-Allylidene]-4-Thiazolidone*

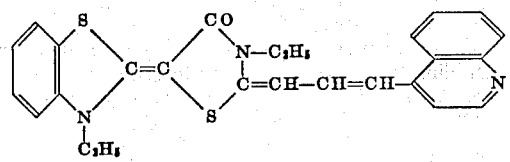

3-ethyl-5-(3-ethyl - 2(3) - benzothiazolylidene)-2-[(1-cyano)-3-(4 - quinolyl)-allylidene]-4-thiazolidone, 0.5 g. (0.001 mole), was combined with 50 ml. of 60% H₂SO₄ and heated slowly to 150° C. After heating for one minute at 150° C., the solution was cooled and poured on crushed ice.

Neutralization with conc. NH₄OH and filtration yielded 0.45 g. of a red-brown solid.

The crude product was recrystallized from 50 ml. of hot ethanol to yield 0.19 g. (41.8%) of a red-brown amorphous solid with a melting point of 245°–248° C.

The absorption maximum at density of 0.675 was 448 mμ at a concentration of 1/160,000 in acetone.

EXAMPLE 9

*3-Ethyl-5[(3-Ethyl - 2(3) - Benzothiazolylidene)-Ethylidene]-2-[(Cyano) - 2 - Quinolylmethylene]-4-Thiazolidone (XIII)*

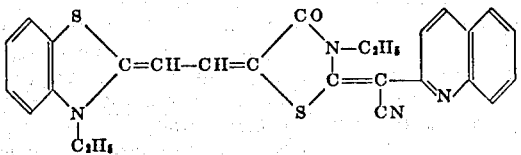

The above compound was prepared by the following procedure involving the preparation of the indicated intermediates:

(a) *2 - (β - acetanilidovinyl) - benzothiazole ethiodide (X)*.—2-methylbenzothiazole ethiodide, 40 grams (0.131 mole), and diphenylformamidine, 25.7 g. (0.131 mole), were combined in 130 ml. acetic anhydride and refluxed fifteen minutes. The reaction mixture was cooled, and chilled overnight.

The dark-purple crystalline solid was filtered and washed with acetone, then air-dried twenty-four hours. The yield was 37.7 g. (63.9%) with a melting point of 219–224° C.

(b) *5 - [3-ethyl-2(3)-benzothiazolylidene)-ethylidene]-3-ethylrhodanine (XI)*.—Thirty grams (0.067 mole) of X and 10.8 g. (0.067 mole) of 3-ethylrhodanine were combined in 200 ml. of absolute ethanol containing 10.2 g. (0.101 mole) of triethylamine. The mixture was refluxed twenty minutes, chilled and filtered.

The crystalline filter cake was washed by slurrying four times with 15-cc. portions of methanol, then dried to constant weight.

The yield of dark yellow crystals was 21.2 g. (90.9%), with a melting point of 265–268° C.

(c) *5-[(3-ethyl-2(3)-benzothiazolylidene)-ethylidene]-2-methylmercapto-4(5)-thiazolone ethyl-p-toluenesulfonate (XII)*.—Twenty grams (0.057 mole) of (XI) and methyl-p-toluenesulfonate, 31.8 g. (0.171 mole) were heated together at 110° C. for eight hours. The reaction mixture was then diluted with 200 ml. acetone, cooled, and filtered. The filter cake was washed with three 50-ml. portions of acetone and dried to constant weight.

Yield of dark yellow crystals was 20.0 g. (65.5%) with a melting point of 231–234° C.

Four grams (0.0081 mole) of 5-[(3-ethyl-2(3)-benzothiazolylidene)-ethylidene]-2-methylmercapto-4(5) - thiazolone ethyl-p-toluenesulfonate (XII) and 1.36 g. (0.0081 mole) of 2-quinolylacetonitrile were combined in 165 ml. of absolute ethanol containing 0.82 g. (0.0081 mole) of triethylamine. The mixture was refluxed twenty-five minutes, then chilled.

The red crystalline solid was filtered, washed with methanol, then dried to constant weight to yield 2.6 grams.

Recrystallization from 800 ml. of absolute ethanol gave a 2.1 g. (56.1%) yield of red needles with green iridescence. Melting point was 263–266° C.

The absorption maximum at density of 0.955 was 520 mμ at a concentration of 1/190,000 in acetone.

*Analysis.*—Calcd. for $C_{27}H_{22}N_4OS_2$: C, 67.19; H, 4.56; N, 11.62; S, 13.30. Found: C, 66.42; H, 4.32; N, 11.38; S, 12.92.

EXAMPLE 10

*5-[(3-Ethyl-2(3)-Benzothiazolylidene) - Ethylidene] - 2-(Cyano-2-Quinolylmethylene)-1-Phenyl-3-Ethyl 4-Imidazolidone*

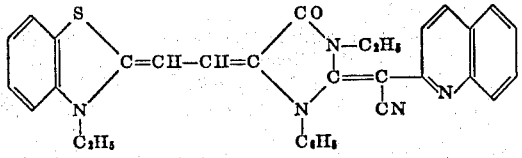

5-[(3-ethyl-2(3)-benzothiazolylidene)-ethylidene] - 2-methylmercapto-1-phenyl-4-imidazolone-1-ethyo - p - toluenesulfonate, 3.5 g. (0.0059 mole), and 0.99 g. (0.0059 mole) of 2-quinolylacetonitrile were combined in 20 ml. of absolute ethanol containing 0.89 g. (0.0088 mole) of triethylamine.

The solution was refluxed ten minutes, chilled overnight, and filtered. The crude crystalline solids were filtered and washed with 50 ml. of ethanol in small portions. Yield of crude product was 2.9 g. (90.9%).

Recrystallization from 50 ml. of hot ethanol resulted in 2.4 g. yield, with melting point of 192–195° C. This product was chromatographed through a 16-inch alumina column, using CHCl₃.

Final recrystallization from CHCl₃ and petroleum ether gave a 1.0 g. (30.4%) yield of dark green crystals with melting point of 191–192.5° C.

The absorption maxima at densities of 0.66 and 0.09 were 532 mμ and 382 mμ, respectively, at concentration of 1/200,000 in acetone.

The mercapto intermediate used in this Example was prepared as follows:

(a) *5-[(3-ethyl-2(3)-benzothiazolylidene)-ethylidene]-3-ethyl-1-phenyl-2-thiohydantoin.* — Ten grams (0.022 mole) of 2-(β-acetanilidovinyl)-benzothiazole ethiodide, prepared as in Example 9, and 4.89 g. (0.022 mole) of 3-ethyl-1-phenyl-2-thiohydantoin were dissolved in 125 ml. of absolute ethanol containing 4.45 g. (0.044 mole) of triethylamine. The solution was refluxed fifteen minutes, then chilled for four hours.

The purple crystals were filtered and washed with 20 cc. of fresh ethanol in small portions, then dried to constant weight. The yield was 7.0 g. (77.4%) with melting point of 204–208° C.

(b) *5-[(3-ethyl-2(3)-benzothiazolylidene)-ethylidene]-2-methylmercapto-1-phenyl - 4 - imidazolone-1-ethyo-p-toluenesulfonate.*—Seven grams (0.017 mole) of (a, above) and 7.34 g. (0.034 mole) of methyl-p-toluenesulfonate were heated together for fifteen hours on a steam bath.

The reaction mixture solidified. The solid was triturated with acetone, filtered, and then washed with 45 ml. of fresh acetone in small portions. The yield of light-purple crystalline product was 6.5 g. (64.5%), with melting point of 231–234° C.

EXAMPLE 11

*3-Ethyl-5-[3-Ethyl-2(3)-Benzoxazolylidene)-ethylidene] 2-Cyano-(2-Quinolylmethylene)-4-Thiazolidone*

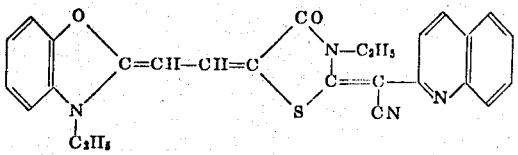

Five grams (0.01 mole) of 5-[(3-ethyl-2(3)-benzoxaolylidene)-ethylidene]-2-methylmercapto -4(5)-thiazolone ethyl-p-toluenesulfonate and 1.68 g. (0.01 mole) of 2-quinolylacetonitrile were added to 125 ml. absolute ethanol containing 2.02 g. (0.02 mole) of triethylamine. The mixture was refluxed ten minutes, then chilled overnight.

The crystalline solids were filtered, washed with 100 ml. of fresh ethanol in small portions, then dried to constant weight. Yield of red crude crystals was 3.3 g (70.8%).

Recrystallization from 1½ liters of $CHCl_3$ and three liters of petroleum ether gave 2.8 g. (60.1%) yield of a red crystalline powder, with melting point of 250–252.5° C.

The absorption maximum at density of 0.79 was 508 m$\mu$ at a concentration of 1/200,000 in acetone.

*Analysis.*—Calcd. for $C_{27}H_{22}N_4O_2S$: C, 69.51; H, 4.72; N, 12.02; S, 6.88. Found: C, 69.29; H, 4.00; N, 12.06; S, 6.72.

The mercapto intermediate used above was prepared by the following three-step process:

(a) *2-(β-acetanilidovinyl)-benzoxazole ethiodide.* — Thirty grams (0.10 mole) of 2-methylbenzoxazole ethiodide and 19.6 g. (0.10 mole) of diphenylformamidine were combined in 150 ml. acetic anhydride and refluxed thirty minutes. After chilling for two hours, the crystalline solids were filtered, washed with acetone until the filtrate was colorless, then dried to constant weight.

The yield of tan-colored crystals was 26.8 g. (61.8%).

(b) *3 - ethyl - 5 - [(3 - ethyl-2(3)-benzoxazolylidene)-ethylidene]-rhodanine.*—Twenty grams (0.046 mole) of (a) and 7.42 g. (0.046 mole) of 3-ethylrhodanine were dissolved in 150 ml. ethanol containing 6.98 g. (0.069 mole) of triethylamine and refluxed twenty minutes. The mixture was chilled overnight, and filtered.

The yield of red-pink crystals, after washing with 80 cc. ethanol and drying to constant weight, was 14.1 g. (95.7%). Melting point was 225–229° C.

(c) *5-[3-ethyl-2(3)-benzoxazolylidene)-ethylidene]-2-methylmercapto-4(5)-thiazolone ethyl-p-toluenesulfonate.*—Ten grams (00.031 mole) of (b) and 11.36 g. (0.062 mole) of methyl-p-toluenesulfonate were heated together on a steam bath for twelve hours. The solidified reaction product was triturated and diluted with 150 ml. acetone, then chilled for three hours.

The purple crystals were filtered, washed with 80 ml. of acetone, and dried to constant weight. The yield was 11.0 g. (71.2%).

EXAMPLE 12

*5 - [3 - Ethyl - 2(3) - Benzothiazolylidene) - Ethylidene]-2-[(3 - Cyano)-2-Quinolyl)-Allylidene]-4-Thiazolidone (XVIII)*

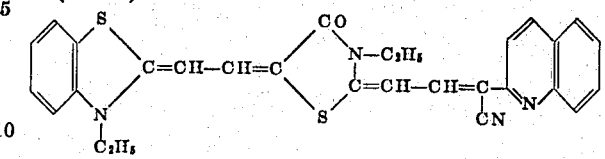

Four grams (0.0066 mole) of 2-(β-acetanilidovinyl)-5 - [(3-ethyl-2(3)-benzothiazolylidene)-ethylidene]-4(5)-thiazolone ethiodide (XVII) and 1.11 g. (0.0066 mole) of 2-quinolylacetonitrile were combined in 45 ml. of pyridine containing 0.99 g. (0.0099 mole) of triethylamine. The mixture was refluxed two hours, then chilled overnight after diluting to one-third the volume with water.

The filtered solids were water-washed until the pyridine odor disappeared, then rinsed with 5 ml. acetone, and dried to constant weight.

The yield of dull-blue crude product was 2.2 g. (68.6%) with melting point of 95–111° C.

The crude product was chromatographed through an 18-inch alumina column, using $CHCl_3$. Total recovery by concentrating eluted $CHCl_3$ solution to dryness was 1.1 g. of greenish-yellow crystals.

Recrystallization was effected by dissolving product in 20 ml. of warm pyridine, adding 3 volumes of methanol, then chilling four hours. After filtration and washing with methanol, the yield of minute purple prisms was 0.3 g. (8.96%) with melting point of 254–256° C., with decomposition.

The absorption maxima at densities of 0.394 and 0.793 were 397 m$\mu$ and 555 m$\mu$, respectively at concentration of 1/150,000 in acetone.

*Analysis.*—Calcd. for $C_{29}H_{24}N_4OS_2$: N, 11.03. Found: N, 10.82.

The ethiodide intermediate used in this example was prepared by the following method:

(a) *2 - dicarbethoxymethylene - 3 - ethyl-5-[(3 - ethyl-2(3)-benzothiazolylidene)-ethylidene]-4-thiazolone (XV).* Fifty-eight grams (0.109 mole) of (XII) and 20.06 g. (0.109 mole plus 15% excess) of diethyl malonate were added to 220 ml. absolute ethanol containing 22.0 g. (0.218 mole) of triethylamine. After refluxing forty minutes, the mixture was chilled overnight and filtered.

The yellow crystals were washed with 80 ml. of acetone in small portions and dried to constant weight. The yield was 16.8 g. (32.5%), with melting point of 180–185° C.

(b) *5 - [(3 - ethyl - 2(3)-benzothiazolylidene) - ethylidene]-2-methyl-4(5)-thiazolone ethiodide (XVI).*—The foregoing (a) above, 16.8 grams (0.039 mole), was dissolved in 300 ml. of 15% hydrochloric acid and refluxed forty-five minutes. The hot solution was filtered, and the filtrate was concentrated to near dryness (10 ml.) with the aid of vacuum and low heat.

The residue was dissolved in 200 ml. absolute ethanol, 50 ml. of saturated NaI solution in methanol were added, and this was chilled at 0° C. for two hours. The crystalline precipitate, which formed immediately, was filtered and washed with 15 cc. of methanol, and finally was washed with 25 ml. of water and then dried to constant weight.

The yield of dark red crystals was 12.6 g. (70.5%), with melting point of 185–191° C. This product was utilized without additional purification in the next experiment.

(c) *2 - (β-acetanilidovinyl)-5-[(3-ethyl-2(3)-benzothiazolylidene) - ethylidene] - 4(5) - thiazolone Ethiodide (XVII).*—Six grams (0.013 mole) of (b) and 2.55 g. (0.013 mole) of diphenylformamidine were combined in 50 ml. of acetic anhydride and refluxed fifteen minutes. The mixture was chilled overnight.

The resulting crystalline solids were filtered, washed with 40 ml. acetone and air-dried overnight. The yield of purple-black crystals was 5.3 g. (67.6%).

EXAMPLE 13

*3-Ethyl-5-[(3-Ethyl-2(3)-Benzoxazolylidene)-Ethylidene]-2-(2-Quinolylmethylene)-4-Thiazolidone*

One gram (0.0022 mole) of 3-ethyl-5-[3-ethyl-2(3)-benzoxazolylidene) - ethylidene]-2-(cyano)-2-(quinolylmethylene)-4-thiazolidone was combined with 140 ml. of 80% $H_2SO_4$ in a flask and heated on a steam bath for one-half hour with agitation. Next, the solution was heated at 180° C. for approximately one minute until pink color was discharged.

The reaction mixture was cooled rapidly and poured on crushed ice. After neutralization with concentrated $NH_4OH$ and filtration, the crude yield of dark red product was 0.9 g. (92.8%).

Recrystallization from 50 ml. of $CHCl_3$/400 ml. petroleum ether mixture gave 0.60 g. (61.7%) yield of dark-red crystalline powder, with melting point of 202–204° C. with decomposition.

The absorption maxium of this product at density of 0.57 was 490 m$\mu$ at a concentration of 1/210,000 in acetone.

EXAMPLE 14

*3-Ethyl-5-[(3-Ethyl-2(3)-Benzothiazolylidene)-Ethylidene]-2-(2-Quinolylmethylene)-4-Thiazolidone*

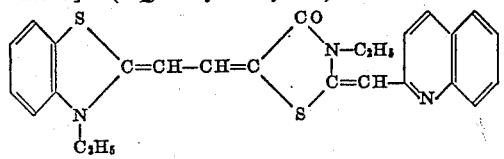

One gram (0.0021 mole) of 3-ethyl-5-[(3-ethyl-2(3)-benzothiazolylidene)-ethylidene]-2-[(cyano)-2 - quinolylmethylene]-4-thiazolidone (XIII) was dissolved in 200 ml. of 80% $H_2SO_4$ by heating on a steam bath for 20 minutes. When clear, the solution was boiled 30 seconds, cooled rapidly, and poured on crushed ice.

After neutralization with conc. $NH_4OH$, and filtration, the yield of brown crude solid was 0.85 gram (88.5%).

The dried crude solid was dissolved in 200 ml. of $CHCl_3$ and passed through an 18-inch alumina column. The impurities were eluted with 2 liters of petroleum ether. The product was removed from the column with acetone and recrystallized, yielding 0.35 g. (37.0%) of brown-red crystals with melting point of 238–240.5° C.

The absorption maximum at density of 0.855 was 493 m$\mu$ at a concentration of 1/150,000 in acetone.

EXAMPLE 15

*3-Ethyl-5-[(3-Ethyl-2(3H)-Benzothiazolylidene)-Ethylidene]-2-(Cyano - 2 - Benzothiazolylmethylene)-4-Thiazolidone*

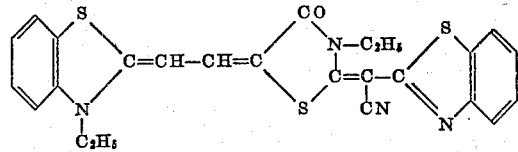

Two grams (0.0037 mole) of 5-[(3-ethyl-2(3)-benzothiazolylidene)ethylidene]-2-methylmercapto-4(5)-thiazolone ethyl-para-toluenesulfonate (XII) and 0.64 gram (0.0037 mole) of 2-benzothiazolylacetonitrile were combined in 50 ml. of absolute alcohol containing 0.56 gram (0.0055 mole) of triethylamine. The mixture was refluxed for 20 minutes, then chilled.

On filtration and washing with ethanol, the yield of crude red crystals was 1.65 g. (91.2%). Recrystallization from 800 ml. acetone resulted in 1.3 g. (71.8%) yield of red-purple crystals with melting point of 264–266° C.

The absorption maximum at density of 0.76 was 530 m$\mu$, at a concentration of 1/220,000 in acetone.

In a number of pending United States patent applications noted below, photographic systems have been described characterized by the presence of at least one halogenated hydrocarbon and preferably a polyhalogenated hydrocarbon represented by the general formula:

$$R\text{—}C\text{—}X_3$$

wherein R represents a monovalent radical selected from the group consisting of H, Cl, Br, I, alkyl, haloalkyl, aryl and aralkyl; and each X represents a halogen atom selected from the group consisting of Cl, Br and I, it being noted that not all of the X's need be the same halogen.

Another aspect of the present invention relates to photosystems wherein the above described novel merocyanine dye bases are utilized in combination with organic halogen compounds of type indicated, whereby increased sensitivity at longer wavelengths is obtained as compared with the sensitivity to longer wavelengths of visible light, experienced with either the styryl dye bases or cyanine dye bases described in the below noted pending patent applications.

In U.S. patent application Serial No. 42,233 it has been disclosed that styryl dye bases and higher vinylene homologues thereof in combination with organic halogen compounds of the type indicated above comprise photographically useful compositions sensitive to visible light.

In U.S. patent application Serial No. 95,031, a similar photographic system is described utilizing cyanine dye bases in combination with organic halogen compounds of the type indicated above.

U.S. patent application Serial No. 100,948 discloses the benefits derived from adding a suitable amount of a leucobase of a di- or tri-phenylmethane dye to the styryl dye base or cyanine dye base photosystems described in the above pending applications.

The photographic system of the present invention comprises the following:

(1) A suitable halogen substituted organic compound;
(2) A sensitizer comprising the novel merocyanine dye bases of the present invention;
(3) A film-forming plastic in which the halogenated organic compound and sensitizer are dispersed; and
(4) As a preferred but optional additional constituent a leuco base of a di- or tri-phenylmethane dye.

(1) *Halogen compound.*—Suitable organic halogen compounds for use with the merocyanine dye bases of the present invention are those represented by the general formula:

$$R\text{—}C\text{—}X_3$$

wherein R represents a monovalent radical selected from the group consisting of H, Cl, Br, I, alkyl, haloalkyl, aryl, aroyl, and aralkyl; and each X represents a halogen atom selected from the group consisting of Cl, Br and I and wherein not all of the X's need be the same halogen.

Organic compounds which have been found to be particularly effective with the merocyanine dye bases of this invention include the following halogenated methanes and ethanes: $CCl_4$, $CBr_4$, $CHCl_3$, $CHBr_3$, $CHI_3$, $CBrCl_3$, $C_2Cl_6$, $C_2Br_6$ and $C_2HBr_5$ and also benzotribromide $C_6H_5CBr_3$ and tribromoacetophenone

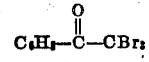

(2) *Merocyanine dye base.*—The merocyanine dye bases having particular utility in the visible-light sensitive print-out compositions and photoprocesses of this invention are the novel merocyanine dye bases described earlier in the present specification represented by the general formula in column 1, lines 22–49, of the present specification and particularly those represented by the more specific general formula appearing in column 1, lines 53–72, of the present specification.

A particularly preferred merocyanine dye base especially effective with a brominated methane or brominated ethane such as $CBr_4$ or $C_2HBr_5$ is the dye of Example 4, namely 3 - ethyl - 5-(3-ethyl-2(3H)-benzothiazolylidene-2-(4-quinolylmethylene)-4-thiazolidone.

(3) *Film-forming plastic.*—Any of a large number of film-forming plastics are suitable as the medium in which the organic halogen compound and merocyanine dye base are supported as a thin film or layer, polystyrene being a particularly preferred plastic with the merocyanine dyes and brominated hydrocarbons indicated above.

In addition, the panchromatic photosystem of this invention, like those described in Serial No. 100,948 is characterized by an enhanced speed due to a synergistic effect obtained by the inclusion of leuco-bases or carbinol bases of triphenylmethane or diphenylmethane dyes in photosystems including organic halides and merocyanine dye bases of the types indicated.

(5) *Proportions.*—Based on the dry weight of the film-forming plastic utilized, the visible-light sensitive compositions of the present invention are most effective when the several constituents are present in the following amounts (parts by weight per part of film-forming plastic):

Organic halogen compound _____ 0.1 to 10.0
Merocyanine dye base _____ .001 to 0.10
Leuco base of di- or triphenylmethane dye _ 0.001 to 0.01

The effectiveness of the merocyanine dye bases of Examples 2, 4, 6, 8, 11 and 13 as sensitizers for photosystems in which carbon tetrabromide was the halogenated hydrocarbon is further indicated by the results reported in the two tables which follow.

Coating solutions were prepared by adding 25 mg. of the merocyanine dye base (sensitizer) to a solution consisting of 4 cc. of acetone, 4 cc. of 10% polystyrene in benzene and 1.4 g. of carbon tetrabromide. Otherwise similar compositions to which 2 mg. of leuco crystal violet had been added were tested in exactly the same way as compositions without the synergist.

Each of the formulations comprising a solution of a film-forming plastic in a vaporizable solvent, and containing carbon tetrabromide and the merocyanine dye base in the proportions indicated was coated on unsubbed Mylar polyester film at a wet thickness of 0.0015 inch and were air dried for 60 minutes before exposure. In addition to tests on an Eastman model 101 sensitometer, a second test procedure was employed utilizing a silver step tablet covered with strips of five Wratten filters (2B Ultraviolet, 47B Blue, 12 Yellow, 58 Green and 25 Red) and with a sixth strip of the tablet left clear (unfiltered). Mylar films coated with the photosensitive compositions described were exposed under this step tablet to illumination from a photoflood lamp at 12 inches distance for 2 minutes. The exposed films were then fixed by washing out any unreacted constituents with a mixture of acetone and petroleum ether (1:4 by volume). The clear film permits densitometer reading and the chosen filters provide an excellent record of the sensitivity of the particular coating formulation to light of different wavelengths. The yellow filter is included because this filter absorbs all of the blue light with very little hold-back of red and green light, and therefore a measure of the blue-light sensitivity of the film can be gained by comparing the density under the yellow filter with that shown under the 2B filter. This appears to be a more reliable indication of blue sensitivity than the number of steps observed under the blue filter, which has a very high filter factor. Similarly, the number of steps observed under the yellow filter may be used as a measure of the green sensitivity by comparing this with the number of steps under the red filter.

Finally, this test procedure allows measurement of density maximum, since it has been found that a 2-minute exposure is long enough to develop the D-max. in compositions of the type being tested.

The results of this method of testing of several of the dye bases described above are listed in Table 1, wherein densities are those read through the green filter on an Eastman 41 color densitometer.

TABLE 1.—RESULTS OF EXPOSURE TO PHOTOFLOOD ILLUMINATION OF MEROCYANINE SENSITIZERS VERSUS 2-(p- DIMETHYLAMINOSTYRYL) QUINOLINE (SQ), IN THE CARBON TETRABROMIDE SYSTEM

| Dye | Filters | | | | | | | | | | | | Base plus Fog |
|---|---|---|---|---|---|---|---|---|---|---|---|---|---|
| | 2B | | 47 Blue | | 12 Yellow | | Clear | | 58 Green | | 25A Red | | |
| | No. of Steps | 21st Step Gross Den. | No. of Steps | 21st Step Gross Den. | No. of Steps | 21st Step Gross Den. | No. of Steps | 21st Step Gross Den. | No. of Steps | 21st Step Gross Den. | No. of Steps | 21st Step Gross Den. | |
| SQ [1] | 10 | .35 | 5 | .15 | 8 | .28 | 12 | .50 | 6 | .15 | 2 | .09 | .02 |
| SQ+LCV | 14 | .96 | 9 | .40 | 13 | .87 | 17 | 1.10 | 10 | .47 | 9 | .46 | .02 |
| Ex. 2 [1] | 11 | .32 | 7 | .19 | 8 | .22 | 13 | .35 | 5 | .18 | 0 | .06 | .04 |
| Ex. 2+LCV | 13 | .46 | 7 | .32 | 10 | .47 | 14 | .42 | 8 | .35 | 2 | .06 | .04 |
| Ex. 4 [1] | 11 | .57 | 5 | .26 | 9 | .33 | 13 | .65 | 6 | .24 | 4 | .16 | .11 |
| Ex. 4+LCV | 15 | .77 | 8 | .53 | 15 | .76 | 17 | .85 | 10 | .64 | 10 | .71 | .14 |
| Ex. 6 [1] | 17 | .37 | 10 | .34 | 16 | .37 | 17 | .37 | 12 | .40 | 12 | .36 | .07 |
| Ex. 6+LCV | 18 | .52 | 11 | .50 | 18 | .47 | 18 | .55 | 13 | .47 | 14 | .44 | .07 |
| Ex. 8 [1] | 9 | .14 | 4 | .11 | 8 | .12 | 10 | .14 | 5 | .12 | 1 | .09 | .05 |
| Ex. 8+LCV | 12 | .32 | 6 | .15 | 12 | .20 | 13 | .32 | 6 | .14 | 3 | .10 | .05 |
| Ex. 11 | ([2]) | ([2]) | ([2]) | ([2]) | ([2]) | ([2]) | ([2]) | ([2]) | ([2]) | ([2]) | ([2]) | ([2]) | ([2]) |
| Ex. 11+LCV | 10 | .32 | 2 | .12 | 9 | .27 | 11 | .35 | 6 | .17 | 1 | .11 | .10 |
| Ex. 13 [3] | 12 | .27 | 5 | .14 | 10 | .25 | 12 | .28 | 6 | .16 | 1 | .06 | .04 |
| Ex. 13+LCV | 13 | .53 | 8 | .31 | 12 | .55 | 15 | .62 | 9 | .42 | 6 | .28 | .06 |
| Ex. 14 | 14 | .46 | 7 | .26 | 12 | .46 | 13 | .43 | 8 | .36 | 7 | .21 | .07 |
| Ex. 14+LCV | 15 | .59 | 8 | .37 | 14 | .53 | 16 | .61 | 9 | .47 | 8 | .39 | .07 |

[1] Structures of these dyes are to be found in Table 2.
[2] Too low to read.
[3] Ex. 13 one minute exposure.

In another series of tests to evaluate the merocyanine dye bases of this invention, strips of Wratten filters were taped over the face of an Eastman 101 sensitometer so that the photosensitive coated film was exposed simultaneously through a Wratten 25 Red filter, a Wratten 58 Green filter and a clear unfiltered area. This sensitometer test was made using a 100 watt tungsten filament lamp whose color temperature is 2850° K. which delivers 1970 meter candles at the film plane and employs an eleven-step wedge.

The film to be exposed was prepared by coating opaque white polyvinylchloride sheets with mixtures consisting of 25 mg. merocyanine dye base
8 cc. ethylcellulose (1% in toluene)
1.4 g. of carbon tetrabromide, and
25 mg. leuco crystal violet (when used)

The coatings had a .0015 inch wet thickness and were air dried for 30 minutes before exposure. After exposure the films were fixed by two successive washes in toluene whereby unreacted starting materials were removed and thereby permitting roomlight examination of the image and density measurements.

The results obtained with the dye bases of Examples 2, 4, 6 and 8, compared with and without the addition of leuco crystal violet, are reported in Table 2.

TABLE 2.—COLOR SENSITIVITY OF COMPLEX MEROCYANINE SENSITIZERS WITH AND WITHOUT LEUCO CRYSTAL VIOLET

| Dye [1] | Structure | Exposure (sec.) | Number of visible steps of an eleven-step Eastman Sensitometric Wedge No. 1 (0.3 density increments between steps) | | | Net density of the most dense step maesured on Eastman Color Densitometer through green filter | | |
|---|---|---|---|---|---|---|---|---|
| | | | No Filter | Wratten Filter | | No Filter | Wratten Filter | |
| | | | | 58-Green | 25-Red | | 58-Green | 25-Red |
| SQ | $N$—CH=CH—$\phi$—N(CH$_3$)$_2$ | 20 | 4 | 2 | 0 | .035 | .010 | 0 |
| SQ plus LCV | | 20 | 7 | 4 | 4 | .48 | .14 | .14 |
| Ex. 8 | (structure) | 20 | 1 | | | | | |
| Ex. 8 plus LCV | | 20 | 8 | | | .37 | | |
| Ex. 6 | (structure) | 20 / 60 | 4 / 4 | 2 / 2 | 1 / 1 | .045 / .05 | | |
| Ex. 6 plus LCV | | 20 / 60 | 4 / 7 | 2 / 4 | 4 / 7 | .09 / .31 | | .14 |
| Ex. 4 | (structure) | 20 | 2 | | | .06 | | |
| Ex. 4 plus LCV | | 20 | 6 | | | .53 | | |
| Ex. 2 | (structure) | 20 | 3 | | | | | |
| Ex. 2 plus LCV | | 20 | 5 | | | .1 | | |

[1] Carbon tetrabromide as activator, LCV added in amount equal to the dye base:
 25 mg. Dye
 8 cc. Ethyl Cellulose (1% in toluene)
 1.4 g. CBr$_4$
All samples fixed in a toluene wash.

The images obtained with the foregoing compositions

TABLE 3.—HEAT INTENSIFICATION OF EXAMPLE 13 WITH AND WITHOUT LEUCO CRYSTAL VIOLET

[Exposure 10 seconds to one Reflector Flood Lamp No. 2. Densities in 21st Step, Using Eastman Kodak No. 1 Color densitometer with Green Filter]

| Dyes | Density | No Heat | Infra-red, 30 sec. | Oven, 30 sec., 150° C. |
|---|---|---|---|---|
| Example 13 | Gross | .29 | .41 | .47 |
| | Base plus Fog | .05 | .05 | .10 |
| | Net | .24 | .36 | .37 |
| Example 13 plus LCV. | Gross | .32 | .47 | .59 |
| | Base plus Fog | .05 | .09 | .08 |
| | Net | .27 | .36 | .50 | may be intensified by exposure to heat, as may be seen from the data in Table 3.

The foregoing specification has described a new family of merocyanine dye bases and has indicated one manner in which they may be used in photosensitive coatings wherein they are particularly useful because of the nearly neutral image color, high visible-light sensitivity and heat intensifiability. Preferred embodiments of the invention have been described and it is not intended that the invention be limited except as may be required by the appended claims.

We claim:

1. A photosensitive composition in the form of a dried film comprising a mixture containing a merocyanine dye base and an organic halogen compound which increases the photosensitivity of said merocyanine dye base to visible light, the merocyanine dye base in said mixture being selected from the group characterized by the following general formula $$R-N-(CH=CH)_{a-1}-C=(CH-CH)_{b-1}=C\underset{Q}{\overset{O=C-N-R_2}{\diagup\diagdown}}C=(CH-CH)_{c-1}-\overset{R_3}{\underset{|}{C}}-C=(CH-CH)_{d-1}=N$$

where
R is selected from the group consisting of lower alkyl and benzyl;
$R_2$ is selected from the group consisting of lower alkyl, aryl and benzyl;
$R_3$ is selected from the group consisting of hydrogen and —CN;
$a$ is an integer of from 1 to 2;
$b$ is an integer of from 1 to 3;
$c$ is an integer of from 1 to 3;
$d$ is an integer of from 1 to 2;
Y and Z each represents the nonmetallic atoms selected from the group consisting of C, S, Se, O, and N, necessary to complete a heterocyclic organic nucleus containing from 5 to 6 atoms in the ring;
Q represents a member selected from the group consisting of an oxygen atom, a sulfur atom, a selenium atom, and a group consisting of $$-\underset{|}{N}-R_4$$

wherein $R_4$ represents a member selected from the group consisting of a lower alkyl group, an aryl group and benzyl;

and the organic halogen compound in said mixture being selected from the group consisting of compounds represented by the general formula R—C—$X_3$, wherein R represents a monovalent radical selected from the group consisting of H, Cl, Br, I, alkyl, haloalkyl, aryl, aroyl, and aralkyl and each X represents a halogen selected from the group consisting of Cl, Br and I; there being between 0.001 and 0.10 part by weight of merocyanine dye base and between 0.1 and 10.0 parts by weight of organic halogen containing compound for each part by weight of supporting material in said dried film.

2. The composition of claim 1 containing in addition, a small amount of a leuco base of a polyphenylmethane dye.

3. The composition of claim 1 in which the merocyanine dye base is one wherein Y and $d$ are chosen so that $$-C=(CH-CH)_{d-1}=N$$

is

[quinoline structure]

4. The composition of claim 1 in which the merocyanine dye base is one wherein Y and $d$ are chosen so that $$-C=(CH-CH)_{d-1}=N$$

is

[quinoline structure]

5. The composition of claim 1 wherein Q is a sulfur atom.

6. The composition of claim 1 wherein the merocyanine dye base is one wherein R, Z and $a$ are chosen so that $$R-N-(CH=CH)_{a-1}-C=$$

is

[benzothiazole structure with $C_2H_5$]

7. The composition of claim 1 wherein the organic halogen is carbon tetrabromide.

References Cited in the file of this patent

UNITED STATES PATENTS

| | | |
|---|---|---|
| 2,153,169 | Brooker | Apr. 4, 1939 |
| 2,504,468 | Thompson | Apr. 18, 1950 |
| 2,556,515 | Brooker et al. | June 12, 1951 |
| 2,653,152 | Dessauer et al. | Sept. 22, 1953 |
| 2,855,304 | Chalkley | Oct. 7, 1958 |
| 2,947,630 | Jones | Aug. 2, 1960 |
| 2,961,318 | Jones | Nov. 22, 1960 |
| 3,042,515 | Wainer | July 3, 1962 |
| 3,058,978 | Berlin et al. | Oct. 16, 1962 |

FOREIGN PATENTS

| | | |
|---|---|---|
| 209,993 | Germany | May 14, 1909 |